US011588670B2

(12) United States Patent
Liu et al.

(10) Patent No.: US 11,588,670 B2
(45) Date of Patent: Feb. 21, 2023

(54) METHOD AND DEVICE FOR INDICATING NUMEROLOGY

(71) Applicant: NEC CORPORATION, Tokyo (JP)

(72) Inventors: Hongmei Liu, Beijing (CN); Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 465 days.

(21) Appl. No.: 16/346,890

(22) PCT Filed: Nov. 3, 2016

(86) PCT No.: PCT/CN2016/000597
§ 371 (c)(1),
(2) Date: May 2, 2019

(87) PCT Pub. No.: WO2018/081913
PCT Pub. Date: May 11, 2018

(65) Prior Publication Data
US 2021/0288856 A1    Sep. 16, 2021

(51) Int. Cl.
*H04L 27/26*    (2006.01)
*H04L 5/00*     (2006.01)

(52) U.S. Cl.
CPC ...... *H04L 27/26025* (2021.01); *H04L 5/0092* (2013.01); *H04L 27/2607* (2013.01); *H04L 27/2666* (2013.01)

(58) Field of Classification Search
CPC ........... H04L 27/26025; H04L 27/2666; H04L 5/0092; H04L 27/2607
See application file for complete search history.

(56) References Cited

U.S. PATENT DOCUMENTS

| 2008/0039133 | A1  | 2/2008  | Ma et al. |
| 2015/0215148 | A1  | 7/2015  | Taori et al. |
| 2017/0367120 | A1* | 12/2017 | Murray ............... H04B 7/0695 |
| 2018/0092002 | A1* | 3/2018  | Manolakos .......... H04W 72/12 |
| 2019/0103931 | A1* | 4/2019  | Yi ......................... H04L 5/001 |
| 2019/0109695 | A1* | 4/2019  | Kim ................... H04L 27/2613 |
| 2020/0169375 | A1* | 5/2020  | Yi ...................... H04W 72/0446 |

FOREIGN PATENT DOCUMENTS

| CN | 101932104 A | 12/2010 |
| CN | 102075310 A | 5/2011 |
| CN | 105099634 A | 11/2015 |
| CN | 105165090 A | 12/2015 |

(Continued)

OTHER PUBLICATIONS

Communication dated Oct. 11, 2019, from the European Patent Office in counterpart European Application No. 16920753.7.

(Continued)

*Primary Examiner* — Jackie Zuniga Abad
(74) *Attorney, Agent, or Firm* — Sughrue Mion, PLLC (57) ABSTRACT

Embodiments of the disclosure provide a method and device for indicating numerology. The method comprises: determining numerology information of a carrier, the numerology information indicating numerologies of one or more basic units for the carrier; and transmitting the numerology information to a terminal device to enable reception based on the numerology information.

14 Claims, 10 Drawing Sheets

(56) References Cited

FOREIGN PATENT DOCUMENTS

| WO | 2011/087418 A1 | 7/2011 |
|---|---|---|
| WO | 2011/143586 A1 | 11/2011 |
| WO | 2016/043906 A1 | 3/2016 |
| WO | 2016/130175 A1 | 8/2016 |

OTHER PUBLICATIONS

International Search Report in International Application No. PCT/CN2016/000597, dated Jul. 27, 2017.
NEC, "Discussion on PSS/SSS/PBCH in numerology multiplexing", 3GPP TSG RAN WG1 Meeting #86bis, R1-1609153, Lisbon, Portugal, Oct. 10-14, 2016 (2 pages total).
Nokia, Alcatel-Lucent Shanghai Bell, "Guard band arrangement supporting mixed numerology", 3GPP TSG-RAN WG1 #86 Bis, R1-1609659, Lisbon, Portugal, Oct. 10-14, 2016 (4 pages total).
InterDigital Communications, "UE Support for Multiple Numerologies for NR", 3GPP TSG-RAN WG1 #86bis, R1-1610022, Lisbon, Portugal, Oct. 10-14, 2016, pp. 1-5 (5 pages total).
Nokia, Alcatel-Lucent Shanghai Bell, "Intra-carrier sub-band for mixed numerology", 3GPP TSG-RAN WG1 #86-Bis, R1-1609660, Lisbon, Portugal, Oct. 10-14, 2016 (3 pages total).
ETRI, "On design of mixed numerology in a NR carrier", 3GPP TSCS RAN WG1 Meeting #86, R1-166941, 2016, pp. 1-4 (5 pages).
Convida Wireless, "Discussion on Sync Signals Supporting Different Numerologies", 3GPP TSG RAN WG1 Meeting #86, R1-167847, 2016, pp. 1-4.
Ericsson, "On resource allocation and guard subcarriers for mixed numerologies", 3GPP TSG RAN WG1 Meeting #86, R1-167033, 2016, pp. 1-3.
ZTE, ZTE Microelectronics, "Frequency multiplexing of numerologies", 3GPP TSG RAN WG1 Meeting #86, R1-166492, 2016, pp. 1-8.
Ericsson, "Mixed Numerology in an OFDM System", 3GPP TSG RAN WG1 Meeting #85, R1-165833, 2016, pp. 1-9.
Convida Wireless, "Discussion on Sync Signal Design for NR", 3GPP TSG RAN WG1 Meeting #86bis, R1-1610371, 2016, pp. 1-4.
Panasonic, "Discussion on frequency domain frame structure for NR", 3GPP TSG RAN WG1 Meeting #86bis, R1-1609815, 2016, pp. 1-6.
Nokia, Alcatel-Lucent Shanghai Bell, "On the number of subcarriers per PRB", 3GPP TSG-RAN WG1 #86bis, R1-1609657, 2016, pp. 1-2.
Huawei, HiSilicon, "Discussion on resource block for NR", 3GPP TSG RAN WG1 Meeting #86bis, R1-1609429, 2016, pp. 1-5.
Fujitsu, "Discussion on subframe design with symbol level alignment", 3GPP TSG RAN WG1 Meeting #86bis, R1-1608808, 2016, pp. 1-5.
Communication dated Jan. 28, 2021 by the European Patent Office in application No. 16 920 753.7.
Communication dated Dec. 22, 2020 by the Japanese Patent Office in application No. 2019-522840.
NEC, " Discussion on numerology multiplexing for supporting different service requirements", 3GPP TSG RAN WG1, #86bis,R1-1609145, Oct. 10-14, 2016, pp. 1-3.
Panasonic, "Resource assignment for mixed numerologies", 3GPP TSG RAN WG1, #86bis, Oct. 10-14, 2016, R1-1610217, pp. 1-3.
Office Action dated Sep. 23, 2022 issued by the Chinese Patent Office in Chinese Application No. 201680090572.0.
Samsung, "Numerology for URLLC", 3Gpp TSG Ran WG1 Meeting #86bis, 2016, R1-1609050, Lisbon, Portugal, October 10-14, pp. 1-4 (4 pages total).
Intel Corporation, "Reference numerology and time alignment", 3GPP TSG RAN WG1 Meeting #86b, 2016, R1-1609503, Lisbon, Portugal, October 10-14, pp. 1-4 (4 pages total).

* cited by examiner

METHOD AND DEVICE FOR INDICATING NUMEROLOGY

CROSS REFERENCE TO RELATED APPLICATIONS

This application is a National Stage of International Application No. PCT/CN2016/000597 filed Nov. 3, 2016, the disclosure of which is incorporated by reference herein in its entirety.

FIELD OF THE INVENTION

Embodiments of the present disclosure generally relate to communication techniques. More particularly, embodiments of the present disclosure relate to a method and device for indicating numerology.

BACKGROUND OF THE INVENTION

Newly-developed mobile standards call for higher data transfer speeds, greater numbers of connections, and better coverage, among other improvements. The 5G standard, according to the Next Generation Mobile Networks Alliance, is expected to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency is expected to be enhanced to meet more requirements of the new standards.

Conventionally, for a single carrier, there is one numerology. Therefore, terminal devices have to employ the same numerology in communication with a network device. This inevitably brings undesired, delays, low spectral efficiency for some kind of traffic.

Accordingly, there is a need for development of better transmission/processing techniques for wireless data transmission to meet different requirements of different applications/users at the same time.

SUMMARY OF THE INVENTION

The present disclosure proposes a solution for indicating numerology.

According to a first aspect of embodiments of the present disclosure, embodiments of the disclosure provide a method performed by a network device. The network device determines numerology information of a carrier. The numerology information indicates numerologies of one or more basic units for the carrier. Then the network device transmits the numerology information to a terminal device to enable reception based on the numerology information.

According to a second aspect of embodiments of the present disclosure, embodiments of the disclosure provide method performed by a terminal device. The terminal device receives numerology information of a carrier from a network device. The numerology information indicates numerologies of one or more basic units for the carrier. Then the terminal device decodes a signal based on the numerology information.

According to a third aspect of embodiments of the present disclosure, embodiments of the disclosure provide a network device. The network device comprises: a controller configured to determine numerology information of a carrier, the numerology information indicating numerologies of one or more basic units for the carrier; and a transmitter the numerology information to a terminal device to enable reception based on the numerology information.

According to a fourth aspect of embodiments of the present disclosure, embodiments of the disclosure provide a terminal device. The terminal device comprises: a receiver configured to receive numerology information of a carrier from a network device, the numerology information indicating numerologies of one or more basic units for the carrier; and a decoder configured to decode a signal based on the numerology information.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

Figure 1:
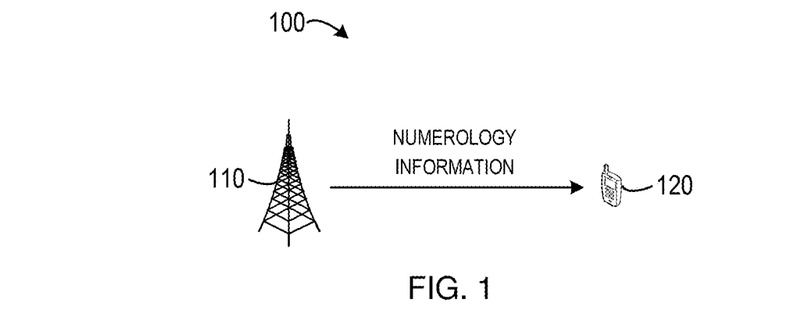
FIG. 1 illustrates a schematic diagram of a communication system 100 according to embodiments of the present disclosure.

Now some exemplary embodiments of the present disclosure will be described below with reference to the figures. Reference is first made to FIG. 1, which illustrates schematic diagram of a communication system 100 according to embodiments of the present disclosure.

In the communication system 100, there illustrate a network device (for example, an eNB) 110 that communicates with a terminal device (for example, a UE) 120 by using a certain transmission pattern. The network device 110 sends numerology information to the terminal device 120, wherein the numerology information indicates numerologies of one or more basic units for a carrier. As such, the terminal device 120 is enabled to receive signals from the network device 110 based on the numerology information.

In the context of the present disclosure, the term "numerology" refers to a set of parameters. In an Orthogonal Frequency Division Multiplexing (OFDM)-based system, the parameters include, for example, but not limited to, a subcarrier spacing, a symbol length, a length of a cyclic prefix (CP), and so on. For instance, a numerology for a subcarrier spacing of 15 KHz may include 14 symbols in one subframe, a normal CP, and so on. A numerology for a subcarrier spacing of 30 KHz may include 28 symbols in one subframe, a normal CP, and so on. Such a numerology is different from the numerology for the subcarrier spacing of 15 KHz.

The term "basic unit" refers to a block of time-frequency resource. The size of a basic unit may depend on the employed numerology. The basic unit may be determined based on a subcarrier spacing and a symbol length used by subcarriers of the carrier. In a frequency domain, the basic unit may be decided by the largest subcarrier spacing. For example, a physical resource block (PRB) with the largest subcarrier spacing may be the frequency size of a basic unit, and/or the largest symbol length may be the time size of the basic unit.

Figure 2A:
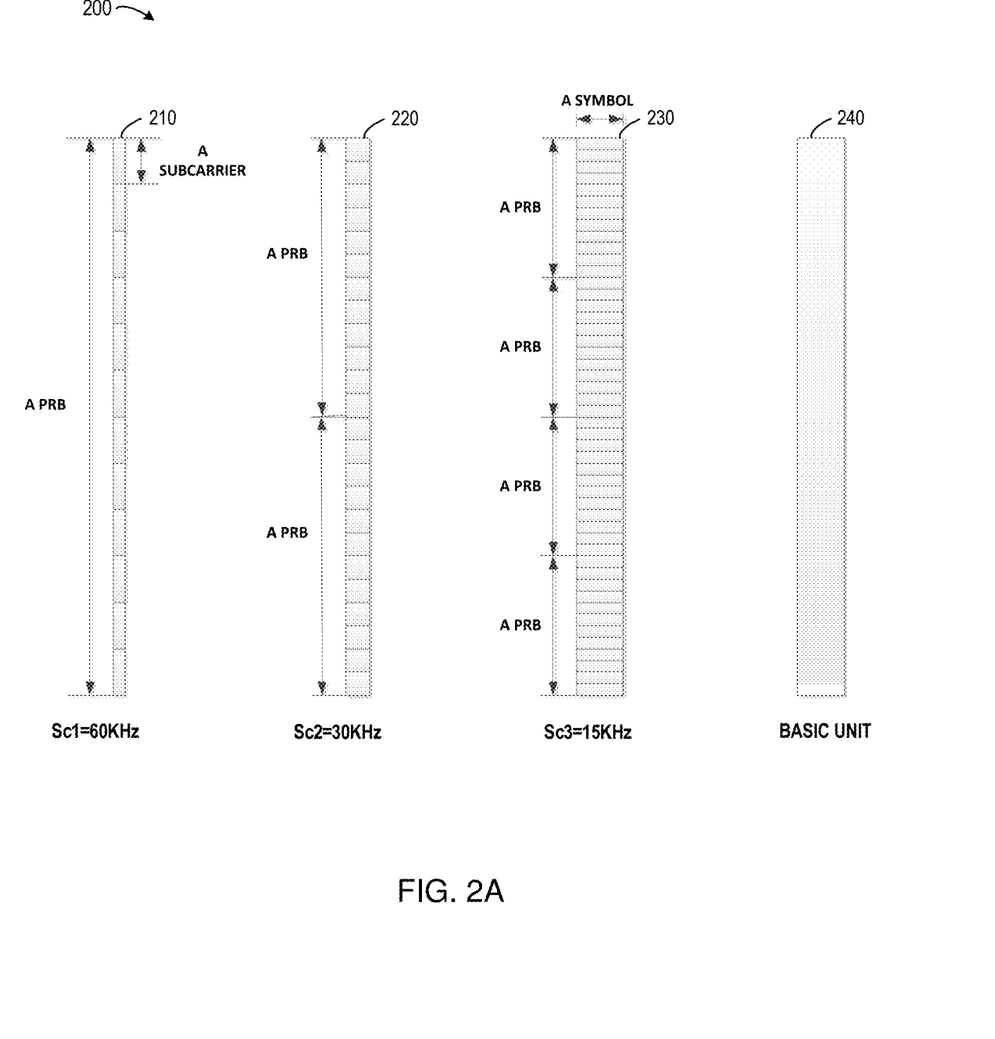
FIG. 2A illustrates a diagram 200 of a basic unit in accordance with embodiments of the present disclosure.

FIG. 2A illustrates a diagram of a basic unit 240 in accordance with embodiments of the present disclosure. There are three subcarriers, Sc1-Sc3, illustrated in the example of FIG. 2A. In the frequency domain, the basic unit 240 is determined based on the largest subcarrier spacing, 60 KHz. That is, the frequency size of the basic unit 240 equals to one PRB of the subcarrier Sc1 of 60 KHz, 2 PRBs of the subcarrier Sc2 of 30 KHz, and 4 PRBs of the subcarrier Sc3 of 15 KHz.

In the time domain, the basic unit 240 is determined based on the largest symbol length. Thus, the time size of the basic unit 240 equals to a symbol of Sc3 of 15 KHz, which has a largest symbol length among Sc1 to Sc3.

Figure 2B:
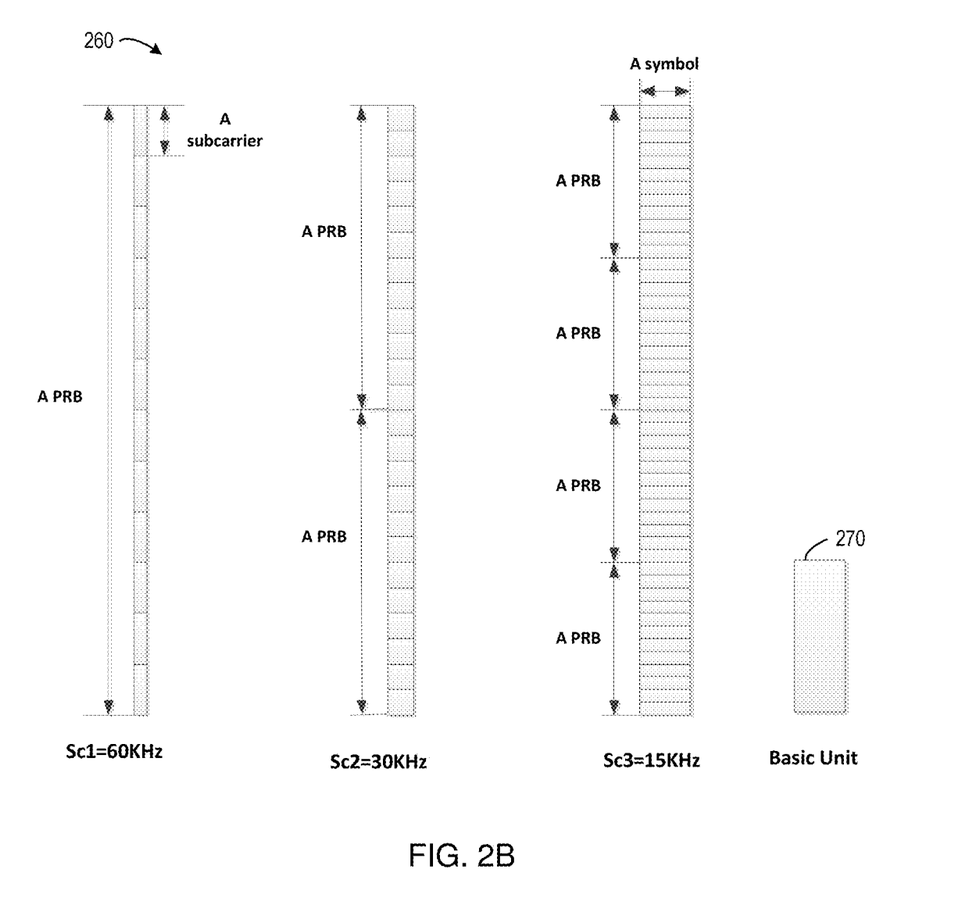
FIG. 2B illustrates a diagram 260 of a basic unit in accordance with further embodiments of the present disclosure.

In addition to the above, the basic unit according embodiments of the present disclosure may be implemented in other suitable forms, for example, multiples of the largest symbol length in time domain, and/or multiples of the largest subcarrier spacing, multiples of a PRB, one or multiples of the smallest subcarrier spacing. FIG. 2B illustrates a diagram 200 of another basic unit 270 in accordance with further embodiments of the present disclosure. In the example shown in FIG. 2B, the basic unit 270 is defined based on the smallest subcarrier spacing in frequency domain. The time domain duration may be indicated by other ways explicitly or implicitly. For instance, the basic unit 270 may have the same duration as the basic unit 240 in the time domain, or the time duration may be multiples of the time duration of the basic unit 240.

It is to be understood that, the above examples are discussed for purpose of illustration, rather than limitation. Those skilled in the art would appreciate that the basic unit can be implemented other suitable forms with the scope of the subject matter of the present disclosure.

Conventionally, a carrier employs a single numerology, thus spectrum utilization may be inefficient when terminal devices have different communication demands. To solve this problem, embodiments of the present disclosure propose a solution as discussed below to employ multiple numerologies in a single carrier. By receiving numerology information indicating numerologies of one or more basic units for the carrier, the terminal devices can receive signals based on the numerology information.

Figure 3:
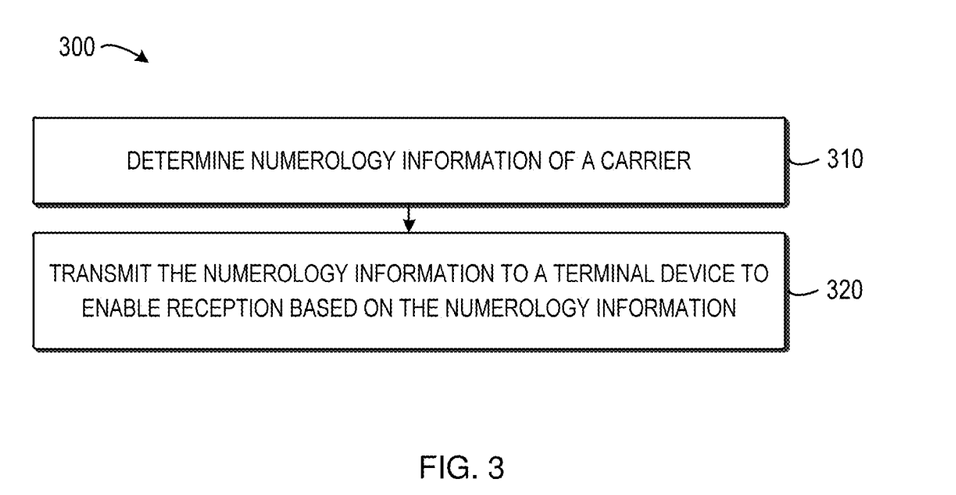
FIG. 3 illustrates a flow chart of a method 300 for performing communication according to embodiments of the present disclosure.

Now some exemplary embodiments of the present disclosure will be described below with reference to the following figures. FIG. 3 illustrates a flow chart of a method 300 for indicating numerology according to embodiments of the present disclosure. The method 300 may be implemented by the network device 110, for example, an eNB or other suitable device.

The method 300 is entered at 310, where the network device determines numerology information of a carrier. The numerology information indicates numerologies of one or more basic units for the carrier. At 320, the network device transmits the numerology information to a terminal device to enable reception based on the numerology information.

Figure 4:
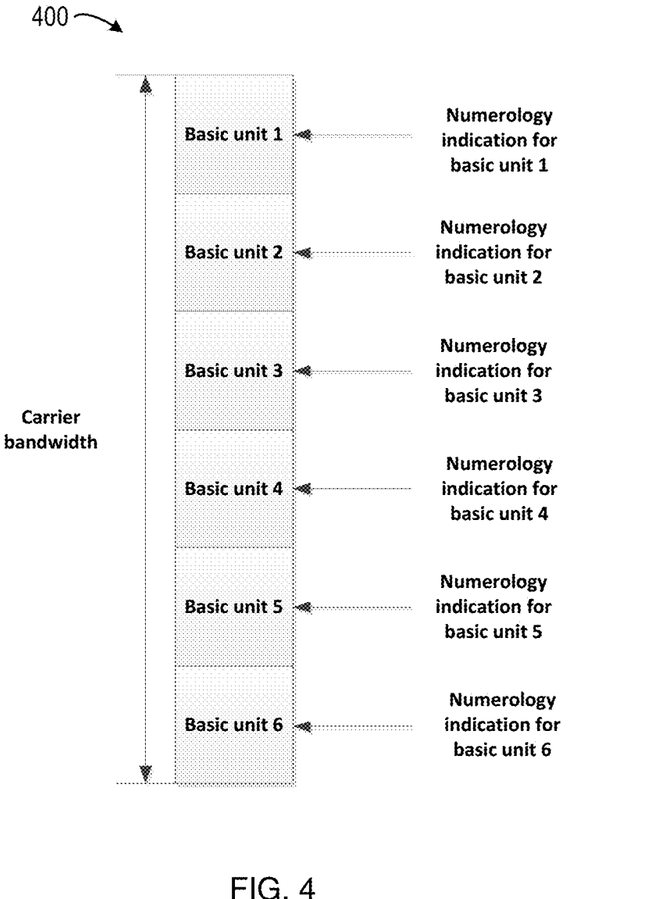
FIG. 4 illustrates a diagram 400 of the distributed indication according to embodiments of the present disclosure.

According to embodiments of the present disclosure, there may be a variety of ways to indicate numerology. In some embodiments, the numerology information may be indicated in a distributed way, which is also referred to as "distributed indication". In this case, the numerology of each basic unit is indicated. For purpose of illustration, the basic unit 240 of FIG. 2A is discussed in these embodiments. Thus, at 310, the network device may determine numerologies for all the basic units. In some implementations, a bitmap may be used to indicate the numerologies of the basic units, that is, one or more bits may be used to indicate the numerology for each basic unit. For example, two bits may be used to indicate subcarrier spacing 15 KHz, 30 KHz, 60 KHz, and 120 KHz, respectively. If the bits are "00", it means that the subcarrier of the numerology is 15 KHz*1, and if the bits are "01", it means that the subcarrier of the numerology is 15 KHz*2=30 KHz. At 320, the network device may transmit information about the numerologies for all the basic units to the terminal device. FIG. 4 illustrates a diagram 400 of the distributed indication according to embodiments of the present disclosure. As shown in FIG. 4, there are six basic units in a carrier, namely, basic units 1 to 6, and there are 6 numerology indications are used for each of the basic units 1 to 6. In this way, the numerologies may be indicated in a flexible way.

In some other embodiments, if the basic unit is defined as the basic unit 270 as discussed with reference to FIG. 2B, when the numerology is changed from a small subcarrier spacing to a larger one, numerologies of at least multiple basic units need to be the same. For example, if the basic unit is based on 15 KHz subcarrier spacing, and the numerology is changed from 15 KHz to 30 KHz, then numerology of at least two adjacent basic units should be same; if the numerology is changed to be 60 KHz, then numerology of at least four adjacent basic units should be the same.

Alternatively, in some embodiments, the numerology information may be indicated in a centralized way, which is also referred to as "centralized indication." In this case, the carrier bandwidth may be divided into several groups, and each group may have a group-specific numerology. One group may include one or more basic units. Details of group division may be defined by a pattern, for example, referred to as a grouping pattern. The grouping pattern may be predefined in several ways, for example, according to the traffic characteristics, similar as Time Division Duplex (TDD) configuration. The grouping pattern may be alternatively defined in specification. In some implementations, the grouping pattern may be carried by system information and/or a Physical broadcast channel (PBCH). In the embodiments, the network device may inform the terminal device the grouping pattern and/or the group-specific numerology. The number of groups may be decided by the grouping pattern. The number may change due to different grouping patterns. The maximum group number may be reserved. In this case, the terminal device may need to firstly decode the grouping pattern, and then decode the corresponding numerology for each group based on the pattern.

Figure 5:
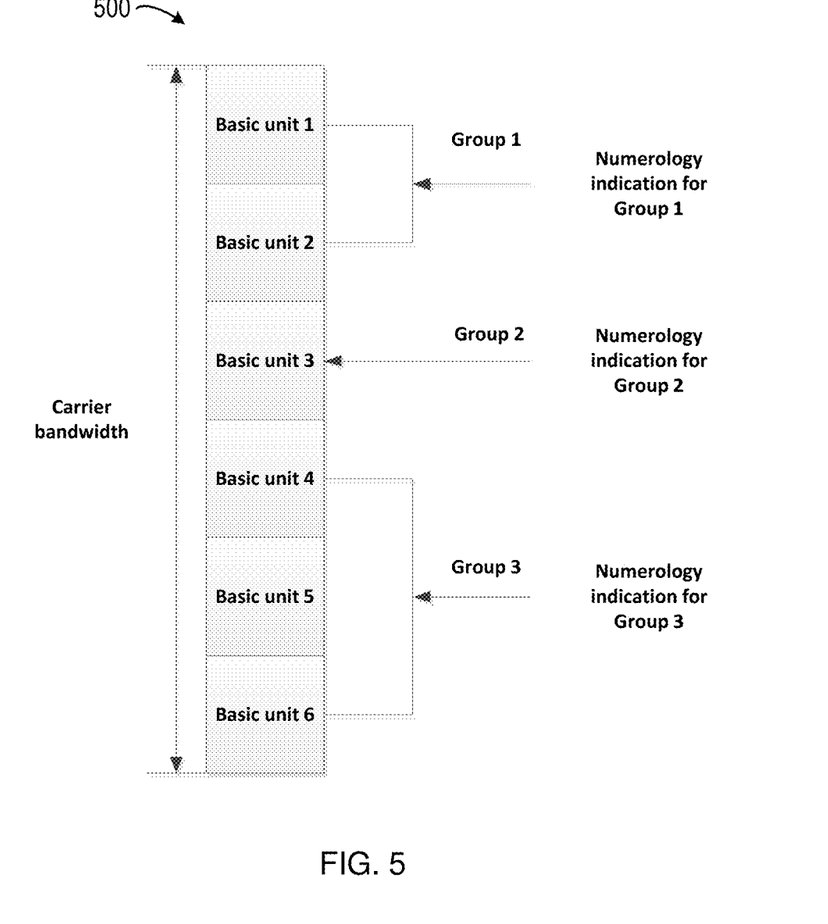
FIG. 5 illustrates a diagram 500 of the centralized indication according to embodiments of the present disclosure.

In these embodiments, at 310, the network device may determine a grouping pattern indicating groups of the basic units, and then determine a numerology for each of the groups. At 320, the network device may transmit information about the grouping pattern and/or the numerology for each of the groups to the terminal device. FIG. 5 illustrates a diagram 500 of the centralized indication according to embodiments of the present disclosure. In the example of FIG. 5, there are six basic units in a carrier, namely, basic units 1 to 6, and they are divided into three groups, namely, groups 1 to 3. As shown, group 1 includes basic units 1 and 2, group 2 includes basic unit 3, and group 3 includes basic units 4-6. A numerology is determined for each of the groups. As such, there are three numerology indications for groups 1, 2 and 3, respectively.

In some other embodiments, if the basic unit is defined as the basic unit 270 as discussed with reference to FIG. 2B, when the numerology is changed from a small subcarrier spacing to a larger one, the basic units may be divided into groups to guarantee basic units in each group have the same numerology. Still referring to FIG. 5, if basic units 1 to 6 are each defined as the basic unit 270, and basic units 1 and 2 correspond to numerology 1, basic unit 3 corresponds to numerology 2 and basic units 4, 5 and 6 correspond to numerology 3, then the basic units 1 to 6 may be divided into three groups to guarantee basic units in each group have the same numerology when the numerology is changed from 15 KHz to 30 KHz.

As a further alternative, the indication may be from a numerology perspective. That is to say, one or more basic units may be indicated for a specific numerology. The indication may be similar to a legacy approach of LTE resource allocation. The basic units corresponding to a numerology may be continuous or discontinuous. In some embodiments, the numerology information may be determined as below. At 310, the network device may determine numerologies for the basic units and determine an association between the numerologies and the basic units. Then, at 320, the network device may transmit information about the numerologies and/or the association to the terminal device. In an embodiment, the numerology information may be implemented in the form of the following table 1.

|   | NUMEROLOGY ID | BASIC UNIT ID |
| --- | --- | --- |
| 1 | Numerology 1 | Basic unit 1, 2 |
| 2 | Numerology 2 | Basic unit 3 |
| 3 | Numerology 3 | Basic unit 4, 5, 6 |

Upon receipt of the numerology information, the terminal device would understand that three numerologies (i.e., Numerology 1, 2 and 3) are designed for the carrier, Basic units 1 and 2 are associated with Numerology 1, Basic unit 3 is associated with Numerology 2, and Basic units 4, 5 and 6 are associated with Numerology 3.

As a still further alternative, the bandwidth of the carrier may be divided into groups, and each group has the same numerology distribution pattern. A numerology distribution pattern indicating numerologies for basic units in one of the groups. For example, if in a group, the $i^{th}$ basic unit (also referred to as basic unit i, i=1, . . . M, and M indicates the total number of basic units in the group) has a numerology corresponding to 15 KHz, and basic unit i+4 has a numerology corresponding to 60 KHz, and basic units i and i+4 within another group share the same numerology 15 KHz and 60 KHz, respectively, then the numerology distribution patterns are the same for these two groups. In this case, the network device may indicate the numerology distribution pattern for a single group to the terminal device, and/or information about the group division, and/or the like. The numerology distribution pattern and/or information about the group division may be specified by specification, by RRC configuration, or in other suitable ways. The numerology distribution pattern for each group can also be indicated dynamically in downlink control information. In some embodiments, the numerology information may be determined as below. At 310, the network device may divide the basic units into groups and determine a numerology distribution pattern indicating numerologies for basic units in one of the groups. Then, at 320, the network device may transmit information about the numerology distribution pattern and/or information about the groups to the terminal device.

In accordance with embodiments of the present disclosure, for different adjacent numerologies, puncturing of one or more subcarriers may be used if a guard band is necessary. From efficiency point of view, the smaller subcarrier spacing may be punctured. In some embodiments, if new waveform design can mitigate the necessity of a guard band, then the puncturing may be unnecessary. According to embodiments of the present disclosure, the guard band may be indicated in a variety of ways. A size for a unit of the guard band (also referred to as a "guard band unit" hereafter) in the frequency domain may be a subcarrier, a PRB, or other suitable length, depending on the adjacent numerologies and/or numerology bandwidth and/or transmission direction. One or more guard band units may be indicated as a guard band.

Figure 6:
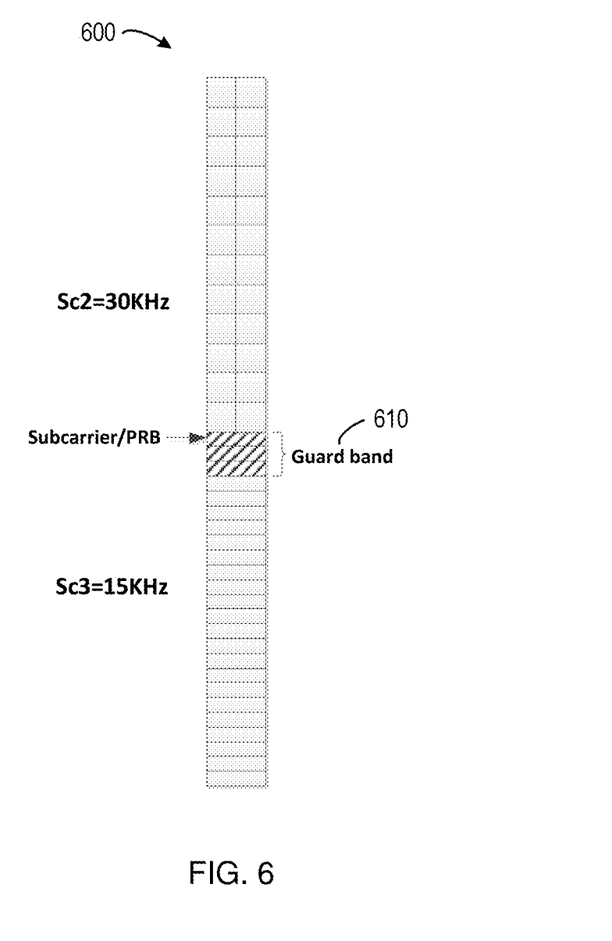
FIG. 6 illustrates a diagram 600 of a guard band 610 according to embodiments of the present disclosure.

FIG. 6 illustrates a diagram 600 of a guard band 610 according to embodiments of the present disclosure. As shown in FIG. 6, there is a guard band 610 between different subcarrier spacings, Sc2 of 30 KHz and Sc3 of 15 KHz. The size of the guard band unit is a subcarrier/PRB, and the guard band in this example includes 3 guard band units.

According to embodiments of the present disclosure, optionally, after 320, the network device may further determines guard band information about a guard band between adjacent basic units based on numerologies of the adjacent basic units, and transmits the guard band information to the terminal device for each basic unit.

According to further embodiments of the present disclosure, optionally, after 320, the network device may further determine guard band information about a guard band between adjacent basic units based on transmission directions of the basic units. For example, a basic unit is used for downlink transmission and the adjacent basic unit is uplink transmission, then there will be a guard band between them. If the transmission direction is changed semi-statically, then the guard band information may be indicated to the terminal device in RRC signaling or PBCH. If the transmission direction, for example, downlink or uplink, is changed dynamically, then the guard band information may be indicated to a terminal device in downlink control information.

In the determination of the guard band information, the network device may detect whether there is a change between numerologies of the adjacent basic units and then determine occurrence of a guard band between the adjacent basic units based on the detection. In some embodiments, the guard band information may include: a number of subcarriers occupied by the guard band, a number of physical resource blocks occupied by the guard band, a basic unit where the guard band is located, and/or the like. The guard band information may indicate whether a guard band exists. From signaling point of view, even the guard band is to be decided not existent, it can be expressed by indicating the guard band to be 0.

After determining the guard band information, the network device may transmit the guard band information to the terminal device. In an embodiment, the guard band information may be transmitted together with the numerology information. Referring back to the embodiments of FIG. 4, the guard band information may be transmitted together with the numerology information for each basic unit. In another embodiment, referring back to the embodiments of FIG. 5, the guard band information may be transmitted together with the numerology information for each group of basic units. More details about the indication of the guard band information will be discussed with the following embodiments with reference to FIGS. 7 and 8.

Figure 7:
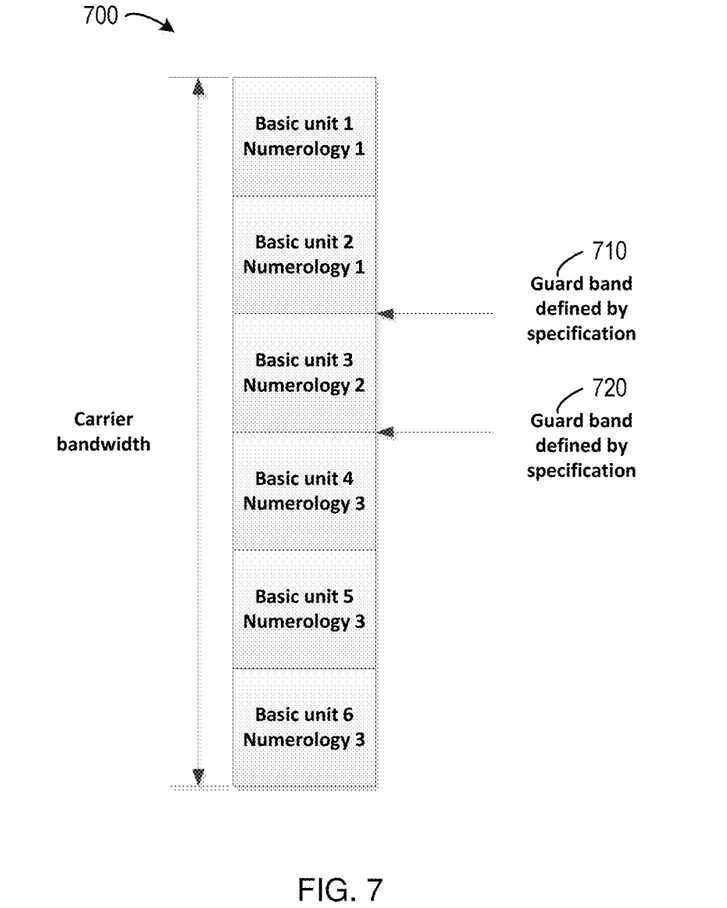
FIG. 7 illustrates a diagram 700 of indication of a guard band according to embodiments of the present disclosure.

In some embodiments, the guard band may be defined by specification. In this case, the guard band may be impacted by adjacent numerology combination, and may be located in the side of the lower subcarrier spacing. For example, when a subcarrier spacing of 30 KHz and a subcarrier spacing of 60 KHz are located adjacently, no matter the detailed bandwidth for each subcarrier spacing, the guard band is the same and is always located in the 30 KHz side. FIG. 7 illustrates a diagram 700 of indication of a guard band according to embodiments of the present disclosure. As shown in FIG. 7, there are two change points of numerologies of basic units 1-6, and two guard bands 710 and 720 defined by specification are located at the change points. In this case, the network device may inform the terminal device information about the numerology, and based on the derived numerology, the terminal device may deduce that there are guard bands 710 and 720.

Alternatively, in some embodiments, the guard band information and/or the numerology information may be transmitted or indicated by system information/PBCH or Dynamic Control Information (DCI). The indication of the guard band information may be according to the numerology distribution pattern, similar to the indication of the numerology information. In this case, the guard band may be impacted by both the adjacent numerology combination and the bandwidth of each numerology.

Figure 8:
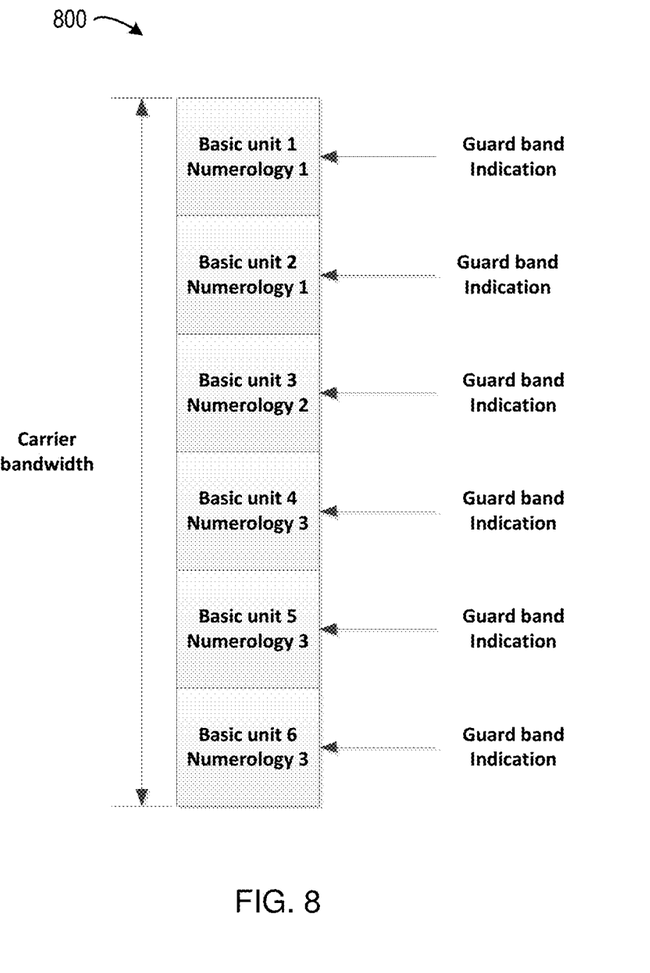
FIG. 8 illustrates a diagram 800 of indication of a guard band according to embodiments of the present disclosure.

In an embodiment, there is a guard band for each basic unit. The guard band may be zero if no numerology change between adjacent basic units or new wave form adoption. Such guard band information may be transmitted together with the numerology information as discussed with reference to FIG. 4. For each basic unit, the numerology and the guard band are indicated. Both independent indication and joint encoding may be employed. FIG. 8 illustrates a diagram 800 of indication of a guard band according to such an embodiment.

In an alternative embodiment, there is a guard band for each numerology change. In this case, the guard band information may be transmitted together with the numerology information as discussed with reference to FIG. 5. For example, the guard band information and/or the numerology information may indicate the numerology distribution pattern. Thus, upon receipt of the information, the terminal device may obtain a change point of numerologies based thereon, and then determine the position of the guard band according to the change point. In this embodiment, the guard band information is transmitted when numerologies of two adjacent basic units change. As such, overhead of transmitting the guard band information is reduced.

In accordance with embodiments of the present disclosure, the network device may further inform the terminal device information about resource allocation. The allocated resource may be indicated by a common index irrespectively of numerology. Thus, the terminal device may understand the resource allocated to it. In some embodiments, the network device may allocate a resource to one or more terminal devices, and then transmit information about the allocated resource to the terminal device. The information about the allocated resource may include one or more of: an index of a basic unit allocated to the terminal devices, an index of a physical resource block in a basic unit allocated to the terminal devices, and other suitable information.

In some embodiments, the basic units may be indexed from 0 to N−1, where N is a total number of the basic units. The total number may be determined in several ways. For example, if the carrier bandwidth is B and the bandwidth of the basic frequency variation units is W, then the total number may be calculated below:

$$N = \text{ceil}(B/W),$$

where "ceil" indicates an operation of rounding up.

The total PRB number (denoted as Nom) within a basic unit may be calculated as:

$$N\_p = W/Sc/N\_Sc$$

where Sc represents the subcarrier spacing for this basic unit, and N Sc represents the subcarrier number within a PRB.

The network device may determine which PRB(s) and/or which basic unit(s) are allocated to terminal devices, and transmit the information about the allocated resource to the terminal devices. The information may include index of the basic unit(s). A terminal device, for example, the terminal device 120, upon receipt of the information about the allocated resource, may identify the index of the basic unit(s) first. Then, the terminal device may determine which PRBs in the allocated basic unit(s) can be used.

In some implementations, one or more bits may be used to indicate the index of the basic unit(s). Then, one or more additional bits may be used to indicate PRBs within the basic unit. These bits may be used in both downlink and uplink to indicate the corresponding allocated frequency domain resource.

Alternatively, in some embodiments, the resource allocation information may be indicated by resource unit(s). The resource unit may be defined based on the smallest subcarrier spacing in frequency domain. For a larger subcarrier spacing, resources allocated to a single UE should consider the relationship between the smallest subcarrier spacing and the larger subcarrier spacing. By way of example, if the resource unit is based on 15 KHz subcarrier spacing, and for a 60 KHz resource allocation, the allocated resources may be multiple of 4, where 4 is obtained by dividing 60 KHz by 15 KHz. The time domain duration may be indicated by other ways explicitly or implicitly. For instance, the resource unit may have the same duration as the basic unit discussed above in the time domain, or the time duration may be multiples of the time duration of the basic unit.

Figure 9:
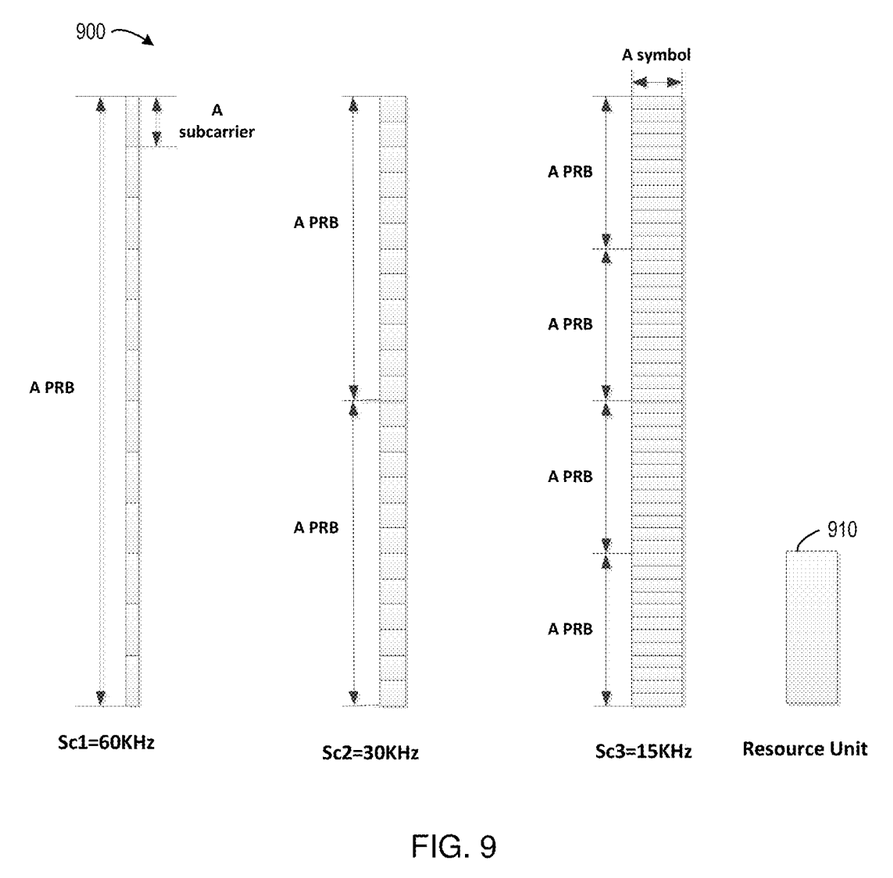
FIG. 9 illustrates a diagram 900 of a resource unit 910 according to embodiments of the present disclosure.

FIG. 9 illustrates a diagram 900 of a resource unit 910 according to embodiments of the present disclosure. In the frequency domain, the resource unit 910 corresponds to the PRB of the smallest subcarrier spacing, namely, Sc3 of 15 KHz. In the time domain, the resource unit 910 corresponds to a symbol of the smallest subcarrier spacing.

With respect the above embodiments, if different channel coding schemes are used for different information block sizes, or if the time domain transmission duration may change due to multi-subframe or mini-slot scheduling, the corresponding Modulation and Coding Scheme (MCS)/Transmission Block Size (TBS) table may change. The chosen of MCS/TBS table may be configured by Radio resource configuration (RRC) signaling.

In accordance with embodiments of the present disclosure, the network device may transmit the numerology information, and/or the guard band information, and/or the information about resource allocation in a variety of ways. In some embodiments, the network device may transmit the numerology information/guard band information in a region of the carrier corresponding to a reference numerology, and transmit the information about the allocated resource in one or more of the basic units, the region of the carrier for transmitting the reference numerology, and/or the like.

In some embodiments, the numerology information, the guard band information, and/or the information about resource allocation may be carried by PDCCH/Enhanced PDCCH (ePDCCH). The PDCCH carrying the numerology information and/or guard band information may be shared by a group of UEs, and may be scrambled by a cell specific/beam specific sequence. And the PDCCH carrying the resource allocation information may be scrambled in a UE-specific way. With respect to the terminal device, for example, a UE, it may decode received signals to obtain the numerology information and/or the guard band information. Then, the UE may decode the information about resource allocation to obtain allocated resources, MCS/TBS, transmission duration, and/or the like, which are collectively called as UE specific control information hereafter.

In some embodiments, the UE specific control information may be located at a time-frequency resource corresponding to a specific numerology. Alternatively, the UE specific control information may also be located at the time-frequency resource corresponding to the reference numerology, combined with the cell/beam-specific control information to be carried in a single PDCCH or scrambled independently to form an independent PDCCH. In some implementations, the PDCCH may occur in a periodical way or in aperiodical way. In the case of the aperiodical implementation, the UE may perform blind detection to identify the PDCCH.

In some alternative embodiments, the control information may also be carried by PBCH or RRC signaling. As a further alternative, the control information may be carried by a combination of RRC signaling and physical layer control information.

In such a case, RRC signaling may be used to indicate a subset of possible numerologies/guard band configurations, and physical layer control information may be used to indicate the numerology within the subset dynamically.

Figure 10:
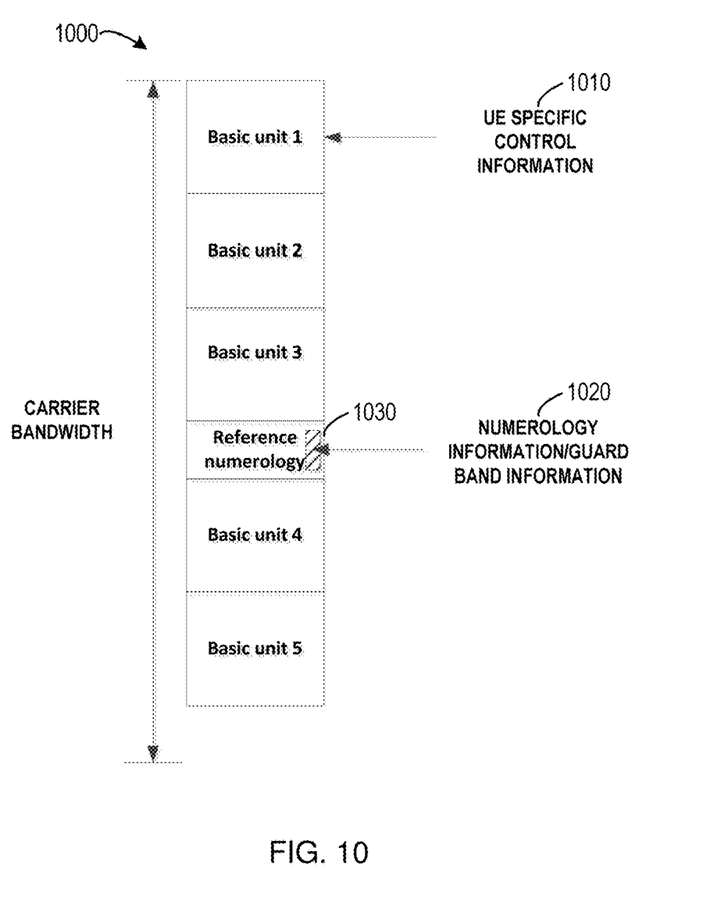
FIG. 10 illustrates a diagram 1000 of information transmission according to embodiments of the present disclosure.

FIG. 10 illustrates a diagram 1000 of transmission of UE specific control information 1010 and numerology information/guard band 1020 according to embodiments of the present disclosure. As shown in the example of FIG. 10, the UE specific control information 1010 is transmitted via basic unit 1, and the numerology information/guard band information are transmitted in a region 1030 of the carrier corresponding to the reference numerology.

Figure 11:
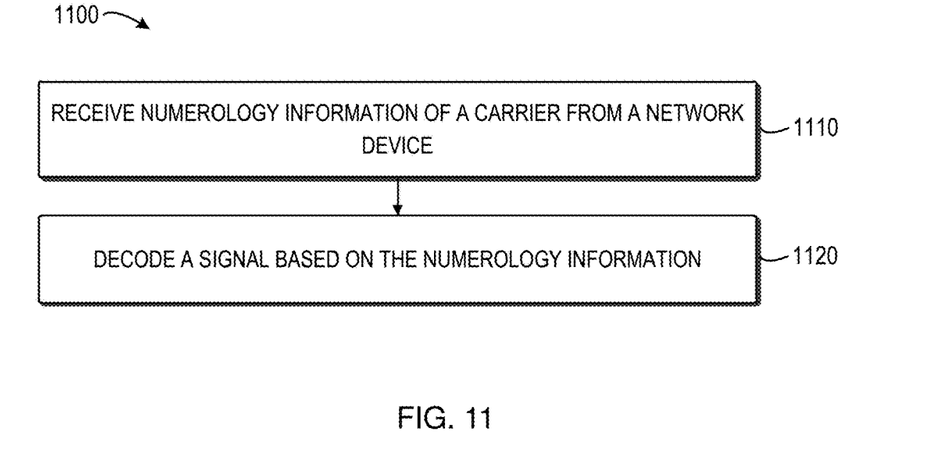
FIG. 11 illustrates a flow chart of a method 1100 for performing communication according to embodiments of the present disclosure.

Reference is now made to FIG. 11, which illustrates a flow chart of a method 1100 for performing communication according to embodiments of the present disclosure. The method 1100 may be implemented by the terminal device 120, for example, a UE or other suitable device.

The method 1100 is entered at 1110, where the terminal device receives numerology information of a carrier from a network device. The numerology information may indicate numerologies of one or more basic units for the carrier. The basic unit may be determined based on a subcarrier spacing and a symbol length used by subcarriers of the carrier. For example, in the frequency domain, the basic unit may be determined based on the largest subcarrier spacing. In the time domain, the basic unit 240 may be determined based on the largest symbol length. In another example, the basic unit may also be determined based on the smallest subcarrier spacing in frequency domain, and/or determined based on the smallest symbol length in time domain.

In some embodiments, at 1110, the terminal device may receive information about numerologies for all the basic units. Alternatively, the terminal device may receive information about a grouping pattern indicating groups of the basic units and/or a numerology for each of the groups. As a further alternative, the terminal device may receive information about numerologies for the basic units and/or an association between the numerologies and the basic units. As a still further alternative, the basic units are divided into groups, and the basic units in each of the groups having the same numerology distribution pattern. In this case, the terminal device may receive at least one of information about a numerology distribution pattern indicating numerologies for basic units in one of groups of basic units and/or information about the groups.

At 1120, the terminal device decodes a signal based on the numerology information.

In some embodiments, optionally, the terminal device may further receive guard band information about a guard band between adjacent basic units. In this case, at 1120, the terminal device may decode the signal based on the numerology information and the guard band information.

In some embodiments, optionally, the terminal device may further information about allocated resource of one or more terminal devices from the network device.

The information about allocated resource may include an index of a basic unit allocated to the terminal devices, an index of a physical resource block in a basic unit allocated to the terminal devices, and/or the like. In this case, at 1120, the terminal device may decode the signal based on the numerology information and the information about allocated resource (also referred to as "information about resource allocation").

In some embodiments, the numerology information may be received in a region of the carrier for transmitting a reference numerology, and the information about the allocated resource may be received in one or more of the basic units, or in the region of the carrier for transmitting the reference numerology, or other suitable regions.

Figure 12:
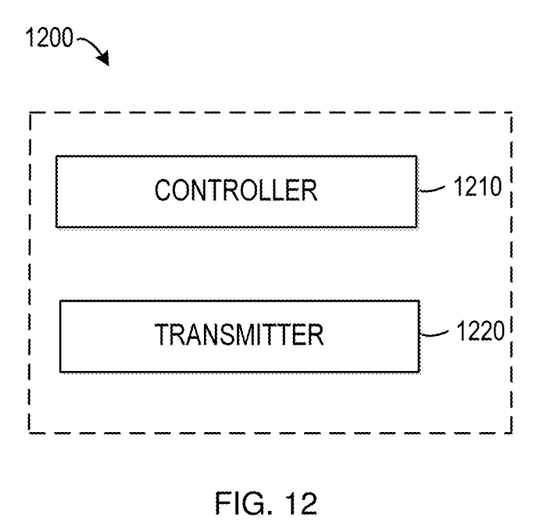
FIG. 12 illustrates a schematic diagram of a network device 1200 according to an embodiment of the present disclosure.

FIG. 12 illustrates a schematic diagram of a network device 1200 according to an embodiment of the present disclosure. According to embodiments of the present disclosure, the network device 1200 may be implemented as the network device 110 or other suitable device in the communication system.

As shown in FIG. 12, the network device 1200 comprises: a controller 1210 configured to determine numerology information of a carrier, the numerology information indicating numerologies of one or more basic units for the carrier; and a transmitter 1220 configured to transmit the numerology information to a terminal device to enable reception based on the numerology information.

In some embodiments, the basic unit may be determined based on a subcarrier spacing and a symbol length used by subcarriers of the carrier.

In some embodiments, the controller 1210 may be further configured to determine numerologies for all the basic units, and wherein the transmitter 1220 may be further configured to transmit information about the numerologies for all the basic units to the terminal device.

In some embodiments, the controller 1210 may be further configured to: determine a grouping pattern indicating groups of the basic units; and determine a numerology for each of the groups, and wherein the transmitter may be further configured to transmit information about the grouping pattern and/or the numerology for each of the groups to the terminal device.

In some embodiments, the controller 1210 may be further configured to: determine numerologies for the basic units; and determine an association between the numerologies and the basic units, and wherein the transmitter 1220 may be further configured to transmit information about the numerologies and/or the association to the terminal device.

In some embodiments, the controller 1210 may be further configured to: divide the basic units into groups; and determine a numerology distribution pattern indicating numerologies for basic units in one of the groups, and wherein the transmitter may be further configured to transmit information about the numerology distribution pattern and/or information about the groups to the terminal device.

In some embodiments, the controller 1210 may be further configured to: determine guard band information about a guard band between adjacent basic units based on numerologies of the adjacent basic units; and wherein the transmitter may be further configured to transmit the guard band information to the terminal device.

In some embodiments, the controller 1210 may be further configured to: detect whether there is a change between numerologies of the adjacent basic units; and determine occurrence of a guard band between the adjacent basic units based on the detection.

In some embodiments, the guard band information may further include one or more of: a number of subcarriers occupied by the guard band, a number of physical resource blocks occupied by the guard band, and a basic unit where the guard band is located.

In some embodiments, the transmitter 1220 may be further configured to transmit the guard band information to the terminal device based on the numerology information.

In some embodiments, the controller 1210 may be further configured to allocate a resource to one or more terminal devices, and wherein the transmitter 1220 may be further configured to transmit information about the allocated resource to the terminal device, wherein the information about the allocated resource includes at least one of: an index of a basic unit allocated to the terminal devices, and an index of a physical resource block in a basic unit allocated to the terminal devices.

In some embodiments, the transmitter 1220 may be further configured to: transmit the numerology information in a region of the carrier for transmitting a reference numerology; and transmit the information about the allocated resource in at least one of: one or more of the basic units, and the region of the carrier for transmitting the reference numerology.

Figure 13:
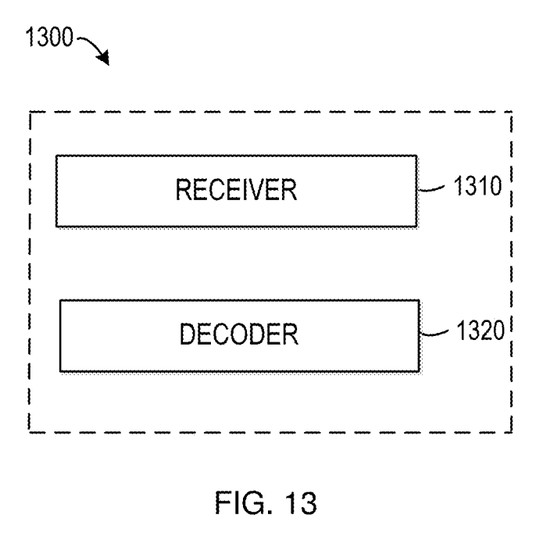
FIG. 13 illustrates a schematic diagram of a terminal device 1300 according to an embodiment of the present disclosure.

FIG. 13 illustrates a schematic diagram of a terminal device 1300 according to an embodiment of the present disclosure. According to embodiments of the present disclosure, the terminal device 1300 may be implemented as the network device 120 or other suitable device in the communication system.

As shown in FIG. 13, the terminal device 1300 comprises: a receiver 1310 configured to receive numerology information of a carrier from a network device, the numerology information indicating numerologies of one or more basic units for the carrier; and a decoder 1320 configured to decode a signal based on the numerology information.

In some embodiments, the basic unit may be determined based on a subcarrier spacing and a symbol length used by subcarriers of the carrier.

In some embodiments, the receiver 1310 may be further configured to receive at least one of: information about numerologies for all the basic units; information about a grouping pattern indicating groups of the basic units and/or a numerology for each of the groups; information about numerologies for the basic units and/or an association between the numerologies and the basic units; and at least one of information about a numerology distribution pattern indicating numerologies for basic units in one of groups of basic units and/or information about the groups, the basic units in the groups having the same numerology distribution pattern.

In some embodiments, the receiver 1310 may be further configured to receive guard band information about a guard band between adjacent basic units, wherein the decoder 1320 may be further configured to decode the signal based on the numerology information and the guard band information.

In some embodiments, the receiver 1310 may be further configured to receive information about allocated resource of one or more terminal devices from the network device, wherein the information about allocated resource includes at least one of: an index of a basic unit allocated to the terminal devices, and an index of a physical resource block in a basic unit allocated to the terminal devices.

In some embodiments, wherein the numerology information may be received in a region of the carrier for transmitting a reference numerology, and the information about the allocated resource may be received in at least one of: one or more of the basic units, and the region of the carrier for transmitting the reference numerology.

It is also to be noted that the device 1200 or 1300 may be respectively implemented by any suitable technique either known at present or developed in the future. Further, a single device shown in FIG. 12 or 13 may be alternatively implemented in multiple devices separately, and multiple separated devices may be implemented in a single device. The scope of the present disclosure is not limited in these regards.

It is noted that the device 1200 or 1300 may be configured to implement functionalities as described with reference to FIGS. 3-10 or FIG. 11. Therefore, the features discussed with respect to the method 300 may apply to the corresponding components of the device 1200, and the features discussed with respect to the method 1100 may apply to the corresponding components of the device 1300. It is further noted that the components of the device 1200 or 1300 may be embodied in hardware, software, firmware, and/or any combination thereof. For example, the components of the device 1200 or 1300 may be respectively implemented by a circuit, a processor or any other appropriate device. Those skilled in the art will appreciate that the aforesaid examples are only for illustration not limitation.

In some embodiment of the present disclosure, the device 1200 or 1300 may comprise at least one processor. The at least one processor suitable for use with embodiments of the present disclosure may include, by way of example, both general and special purpose processors already known or developed in the future. The device 1200 or 1300 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the device 1200 to at least perform according to the method 300 as discussed above and to cause the device 1300 to at least perform according to the method 1100 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 3 or 11 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a network device, comprising:
    transmitting, to a terminal device, resource allocation information of one or more resource units via a RRC signaling, wherein the resource allocation information comprises:
        numerology information of each of the one or more resource units;
        an index of each of the one or more resource units; and
        a first index of a physical resource block in each of the one or more resource units and a number of physical resource blocks in each of the one or more resource units.

2. The method of claim 1, wherein the first index is an index of a first physical resource block in a first resource unit allocated to the terminal device.

3. The method of claim 2,
    wherein the allocation information indicates a first guard band adjacent to the first resource unit and adjacent to a second resource unit, and
    wherein the method further comprises:
        detecting a change between a first numerology of the first resource unit and a second numerology of the second resource unit; and
        determining an occurrence of the first guard band between the first resource unit and the second resource unit based on the detection.

4. The method of claim 2,
    wherein the first resource unit comprises user equipment specific (UE-specific) control information for the terminal device, and
    wherein the method further comprises transmitting the numerology information and guard band information in a region of a carrier corresponding to a reference numerology.

5. The method of claim 1, further comprising:
    transmitting, to the terminal device, a signal based on the resource allocation information.

6. A method performed by a terminal device, comprising:
    receiving, from a network device, resource allocation information of one or more resource units via a RRC signaling, wherein the resource allocation information comprises:
        numerology information of each of the one or more resource units;
        an index of each of the one or more resource units; and
        a first index of a physical resource block in each of the one or more resource units and a number of physical resource blocks in each of the one or more resource units.

7. The method of claim 6, wherein the first index is an index of a first physical resource block in a first resource unit allocated to the terminal device.

8. The method of claim 6, further comprising:
    receiving, from the network device, a signal based on the resource allocation information.

9. A network device, comprising:
    a memory configured to store a program; and
    a processor configured to execute the program to:
        transmit, to a terminal device, resource allocation information of one or more resource units via a RRC signaling, wherein the resource allocation information comprises:
            numerology information of each of the one or more resource units;
            an index of each of the one or more resource units; and
            a first index of a physical resource block in each of the one or more resource units and a number of physical resource blocks in each of the one or more resource units.

10. The network device of claim 9, wherein the first index is an index of a first physical resource block in a first resource unit allocated to the terminal device.

11. The network device of claim 9, wherein the processor is further configured to:
    transmit, to the terminal device, a signal based on the resource allocation information.

12. A terminal device, comprising:
    a memory configured to store a program; and
    a processor configured to execute the program to:
        receive, from a network device, resource allocation information of one or more resource units via a RRC signaling, wherein the resource allocation information comprises:
            numerology information of each of the one or more resource units;
            an index of each of the one or more resource units; and
            a first index of a physical resource block in each of the one or more resource units and a number of physical resource blocks in each of the one or more resource units.

13. The terminal device of claim 12, wherein the first index is an index of a first physical resource block in a first resource unit allocated to the terminal device.

14. The terminal device of claim 12, wherein the processor is further configured to:
    receive, from the network device, a signal based on the resource allocation information.

* * * * *